(12) United States Patent
Van Horne et al.

(10) Patent No.: US 6,460,084 B1
(45) Date of Patent: Oct. 1, 2002

(54) FORCED NETWORK PORTAL

(75) Inventors: Peter Van Horne; Edwin James Van Horne, both of San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/288,880

(22) Filed: Apr. 9, 1999

Related U.S. Application Data (63) Continuation-in-part of application No. 09/057,028, filed on Apr. 8, 1998, now Pat. No. 6,286,039, which is a continuation of application No. 09/033,443, filed on Mar. 2, 1998, now Pat. No. 6,128,601, which is a continuation of application No. 08/919,397, filed on Aug. 28, 1997, now Pat. No. 5,987,430.

(51) Int. Cl.[7] .............................................. G06F 15/16
(52) U.S. Cl. ....................... 709/227; 709/217; 709/218; 709/219; 709/229; 709/200
(58) Field of Search ................................ 709/200, 227, 709/228, 229, 225, 217, 218, 219, 224

(56) References Cited

U.S. PATENT DOCUMENTS

| | | | |
|---|---|---|---|
| 5,003,595 A | | 3/1991 | Collins et al. ................. 380/25 |
| 5,185,860 A | * | 2/1993 | Wu ............................. 709/224 |
| 5,241,594 A | | 8/1993 | Kung ............................ 380/4 |

(List continued on next page.)

OTHER PUBLICATIONS

Carrel, D. et al., "The TACACS30 Protocol, Version 1.78", Cisco Systems, Inc., printed from ftp://ftpeng.cisco.com/gdweber/tac–rfc.1.78.txt on Oct. 23, 2000.

"CiscoSecure TACACS+ and RADIUS", Cisco Systems, Jun. 1997.

Cisco Systems, Inc. "CiscoDNS/DHCP Manager", printed from http://mwrns.noaa.gov/cisco/cc/td/doc/reprdct/res32/htm, on Sep. 10, 1998, 4 pages.

Cisco Systems, Inc., "Cisco DNS/DHCP Manager V.1.1", printed from http://www.combinet.com/warp/public/751/dnsmg/dnsmg_ds.htm, on Sep. 10, 1998, 4 pages.

Cisco Systems, Inc., "Cisco DNS/DHCP Manager V.1.1", printed from httpo://www.combinet.com/warp.public/751/dnsmg/dnsmg_pa.htm, on Sep. 10, 1998, 7 pages.

Cisco Systems, Inc. "DHCP Solution Helps Scale and Configure IP Nodes in Growing Switched Networks", printed from http://cio.cisco.co.jp/warp/public/795/6,html, on Sep. 10, 1998, 2 pages.

(List continued on next page.)

*Primary Examiner*—Ayaz Sheikh
*Assistant Examiner*—Oanh L. Duong
(74) *Attorney, Agent, or Firm*—Thelen Reid & Priest LLP; David B. Ritchie (57) ABSTRACT

A system manages communications between a user and a network by receiving a user request for access to a network file during a user network connection session with a connecting network, determining whether the user has a connected user session state or a disconnected user session state with respect to a portal server, responding to a disconnected user session state by determining a user identity that specifies a physical location for the user and providing the user with a redirected page for display in a user graphical interface program in accordance with the determined user physical location user identification and in accordance with service selection information, and then changing the user session state to a connected state, and responding to a connected user session state by routing the user request for access to the network file to a network server. The system thereby controls user access to web pages, but does not require any specialized client-side software, and permits different content to be delivered according to the location of the user who will receive it.

26 Claims, 4 Drawing Sheets

U.S. PATENT DOCUMENTS

| | | | |
|---|---|---|---|
| 5,526,489 A | | 6/1996 | Nilakantan et al. ..... 395/200.02 |
| 5,561,769 A | | 10/1996 | Kumar et al. .......... 395/200.05 |
| 5,684,950 A | | 11/1997 | Dare et al. ............. 395/187.01 |
| 5,812,776 A | * | 9/1998 | Gifford ........................ 709/217 |
| 5,835,727 A | | 11/1998 | Wong et al. ........... 395/200.68 |
| 5,845,070 A | | 12/1998 | Ikudome ................ 395/187.01 |
| 5,898,780 A | | 4/1999 | Liu et al. ....................... 380/25 |
| 5,944,824 A | | 8/1999 | He ............................... 713/201 |
| 5,964,830 A | * | 10/1999 | Durrett |
| 5,974,453 A | | 10/1999 | Andersen et al. ........... 709/220 |
| 5,987,232 A | | 11/1999 | Tabuki .................. 395/187.01 |
| 5,991,810 A | * | 11/1999 | Shapiro et al. ............ 709/229 |
| 5,991,828 A | | 11/1999 | Horie et al. ..................... 710/8 |
| 6,006,334 A | | 12/1999 | Nguyen et al. ............... 71/202 |
| 6,009,103 A | | 12/1999 | Woundy ..................... 370/401 |
| 6,012,088 A | | 1/2000 | Li et al. ...................... 709/219 |
| 6,021,496 A | | 2/2000 | Dutcher et al. ............. 713/202 |
| 6,026,441 A | | 2/2000 | Ronen ........................ 709/227 |
| 6,091,951 A | | 7/2000 | Sturniolo et al. ........... 455/432 |
| 6,119,160 A | | 9/2000 | Zhang et al. ............... 709/224 |
| 6,141,687 A | | 10/2000 | Blair .......................... 709/225 |
| 6,157,946 A | * | 12/2000 | Itakura et al. .............. 709/217 |
| 6,182,141 B1 | * | 1/2001 | Blum et al. ................. 709/227 |

OTHER PUBLICATIONS

DHCP FAQ, pp. 1–22, printed from http://web.syr.edu/~jmwobus/comfaws/dhcp.faw.html.

Droms, R., "Dynamic Host Configuration Protocol," Network Working Group, RFC 1531, Oct. 1993.

Droms, R., "Interoperation Between DHCP and BOOTP", Oct., 1993, Network Working Group, pp. 1–4, printed from http://www.join.com/rfc1534.html.

"Hot Products & Solutions—IP Address Management: A White Paper", Network Registrat, American Internet Corporation, Bedford, MA, printed from http://www.american.com/ip–mgmt.html, on Jul. 24, 1998.

Rekhter et al., "RFC 1597: Address Allocation for Private Internets", Mar. 1994, 6 pages.

"Remote Access Network Securtiy", Ascend Communications, Inc., printed from http://www.ascend.com/1103.html, on Jul. 24, 1998, pp. 1–8.

Rigney, et al., "Remote Authentication Dial In User Service (RADIUS)", Network Working Group, RFC 2138, Apr. 1997, pp. 1–57.

"Three Ways to Manage IP Addresses", PC Magazine: IP Address Management, printed from http://www.zdnet.com/pcmag/features/ipmanage/ip–s2.htm, on Sep. 10, 1998.

* cited by examiner

FORCED NETWORK PORTAL

CROSS-REFERENCE TO RELATED APPLICATIONS

This application is a continuation-in-part of U.S. application Ser. No. 09/057,028 filed Apr. 8, 1998 U.S. Pat. No. 6,286,039, which is a continuation of U.S. application Ser. No. 09/033,443 filed Mar. 2, 1998 U.S. Pat. No. 6,128,601, which itself is a continuation of U.S. application Ser. No. 08/919,397 filed Aug. 28, 1997 U.S. Pat. No. 5,987,430.

BACKGROUND OF THE INVENTION

1. Field of the Invention

This invention relates generally to computer networks and, more particularly, to computer communication with networks.

2. Description of the Related Art

Access to the Internet is becoming increasingly popular with the general public. Users gain access through a variety of means, including personal Internet service providers (ISP's) and high speed network connections through office systems, or fiber optic cable such as so-called cable modems, or high speed digital lines such as ISDN or xDSL lines. It is becoming increasingly important to support user access at all times, even as people travel away from their home and office. In addition to commercial ISP's, who are in business solely to provide Internet access, many companies or institutions provide Internet access to employees, clients, or customers. For example, hundreds of users may be connected by an office system, or by university networks, or hotel systems for guests. Typically, a user will view Internet content through a graphical browser application, such as "Navigator" by Netscape Communications Corp. or "Internet Explorer" by Microsoft Corporation. Such browsers are especially proficient at retrieving graphical Internet pages (files) from the "World Wide Web" (WWW) and displaying a combination of images, moving video, and audio.

The web page that is displayed when such browser programs are launched can typically be selected by the individual user. Such a page is referred to as a "home" page. Because the home page is displayed each and every time the browser program is launched, it has not escaped the attention of advertisers that there is a built-in audience for viewing ad content. As a result, many commercial enterprises have spent thousands of dollars designing web pages that users might find desirable enough to designate as their home page. Such a page becomes a jumping off point for the user during Internet access. Such web sites are referred to as "portal" sites.

As with magazine circulation, the ad cost (or value of) a portal site depends largely on the number of viewers that the site experiences. As a result, some Internet access providers have highly valued operations. For example, the America On-Line (AOL) service operates a proxy server, so that all AOL subscribers gain access to the Internet only through the AOL link. This means that all AOL users see the same home page, or portal site, which therefore can be valued for the delivery of ad content. The proxy server system, however, requires special purpose access software to be installed on the user computer, and also requires a large investment in infrastructure by the service provider. Moreover, despite having immense amounts of demographic data on subscribers, the home page displayed to subscribers is not generally adapted for the specific subscriber who is logging in.

Other portal sites are generally web sites with specialized content. For example, many Internet search engine and indexing services urge Internet users to adopt their respective home pages as a portal site. Some of these services include Yahoo, Excite, and Alta Vista. Other companies have developed their respective company home pages as portal sites for Internet users. Examples of these sites include Netscape Communications Corp., Microsoft Corp., and specialized services such as "Sidewalk" travel information and "ZD Net" computer publications and information.

One advantage of such portal sites is that they do not require any action by the user beyond pointing their browser to the site. There is no special access software or equipment to install, and the operation of the user's computer is not changed. Thus, the content provider does not need to invest in excessive infrastructure or distribution of special software. Portal sites such as these web pages, however, do not offer particularized content. That is, all users see the same display page upon visiting the web site. The value of such portal sites would increase significantly if the presentation to users could be customized for each user. This would enable targeted advertising to be delivered.

Some sites can somewhat customize their presentation by storing user information, such as by maintaining "cookies" on the user's computer. When the user visits the portal web site, the web site server obtains information from the cookie and adjusts the information sent to the user for display. Examples of such modified web presentations include, for example, news sites such as MSNBC. While such techniques permit some amount of customizing the display, user viewing is entirely voluntary. That is, users may register with such sites to obtain particular information that they have preselected, but they are in no way obligated to visit such sites after registering. It would be more advantageous to content developers and advertisers if they could have assurance that certain users would be forced to view their sites when accessing web pages over the Internet.

From the discussion above, it should be apparent that there is a need for an Internet access technique that controls user access to web pages but does not require any specialized client-side software, and permits different content to be delivered according to the user who will receive it. The present invention fulfills this need.

SUMMARY OF THE INVENTION

The present invention provides a network in which communications between a user and a network are provided by receiving a user request for access to a network file during a user network connection session with a connecting network, determining whether the user has a connected user session state or a disconnected user session state with respect to a portal server, responding to a disconnected user session state by determining a user identity that specifies a physical location for the user and providing the user with a redirected page for display in a user graphical interface program in accordance with the determined user physical location identification by username entry and in accordance with service selection information, and then changing the user session state to a connected state, and responding to a connected user session state by routing the user request for access to the network file to a network server.

Other features and advantages of the present invention should be apparent from the following description of the preferred embodiment, which illustrates, by way of example, the principles of the invention.

DESCRIPTION OF THE PREFERRED EMBODIMENT

Figure 1:
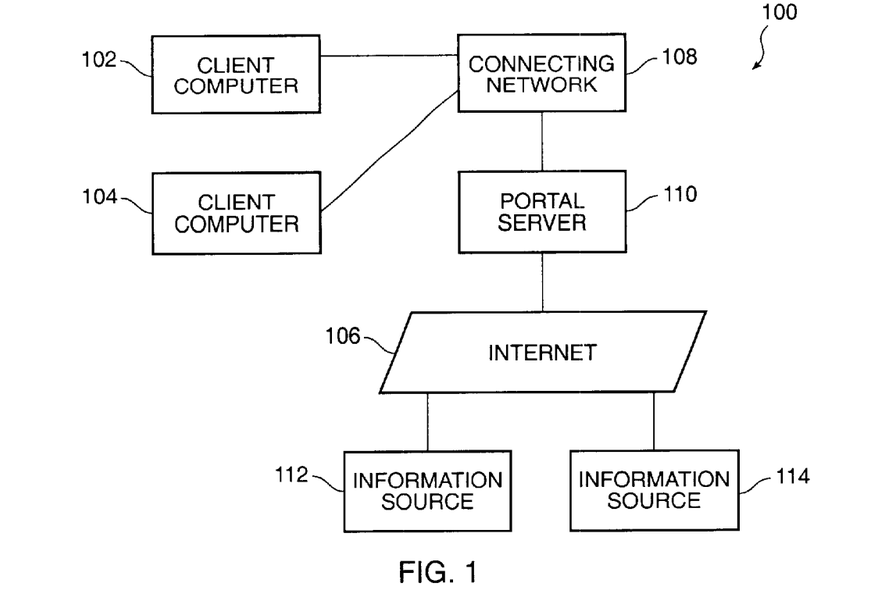
FIG. 1 is a representation of a computer network system with one or more client computers that gain access to the Internet through a portal server constructed in accordance with the present invention.

FIG. 1 illustrates an exemplary computing system 100 constructed in accordance with the present invention. The system includes one or more client computers 102, 104 that are connected to the Internet 106 through a connecting network 108. When a user at a client computer wants to view a web page, the user sends a message to the connecting network that requests the web page. In accordance with the invention, a portal server 110 intercepts the user's page request between the connecting network 108 and the Internet 106. The portal server determines whether or not the user has already connected through the portal. If the user has connected, then the portal routes the user request to the Internet, where the request is delivered to an appropriate information source 112, 114 so the requested page can be returned to the original user 102, 104. If the user has not previously connected through the portal, then the portal determines the exact physical location of the user and provides the user with a redirected page for display in a user graphical interface program, based on the physical location user identity and on service selection information. The portal server then changes the user session state to show that the user is connected, and then routes the user request for the web page to the Internet and the information sources 112, 114. In this way, the portal server 110 forces a portal display page to be viewed at the user 102, 104 until the user is deemed connected.

It should be noted that the portal server 110 has great flexibility in terms of the type of connecting network with which it can interface. For example, the connecting network 108 can comprise a local area network (LAN) at a particular site, such as at an office suite, hotel, multiple office business, or other network computer installation. Such a connecting network can make use of independent means of gaining Internet access, such as through ISP's with high-speed digital connections or conventional analog telephone lines. Alternatively, the connecting network 108 can itself be an ISP's user base. That is, the client computers 102, 104 may comprise the subscribers to an ISP, and the ISP can route all of its subscriber Internet traffic through the portal server 110. In this way, the ISP can force any home page it desires on its subscribers, user-by-user, with a different home page for each, if desired.

Figure 2:
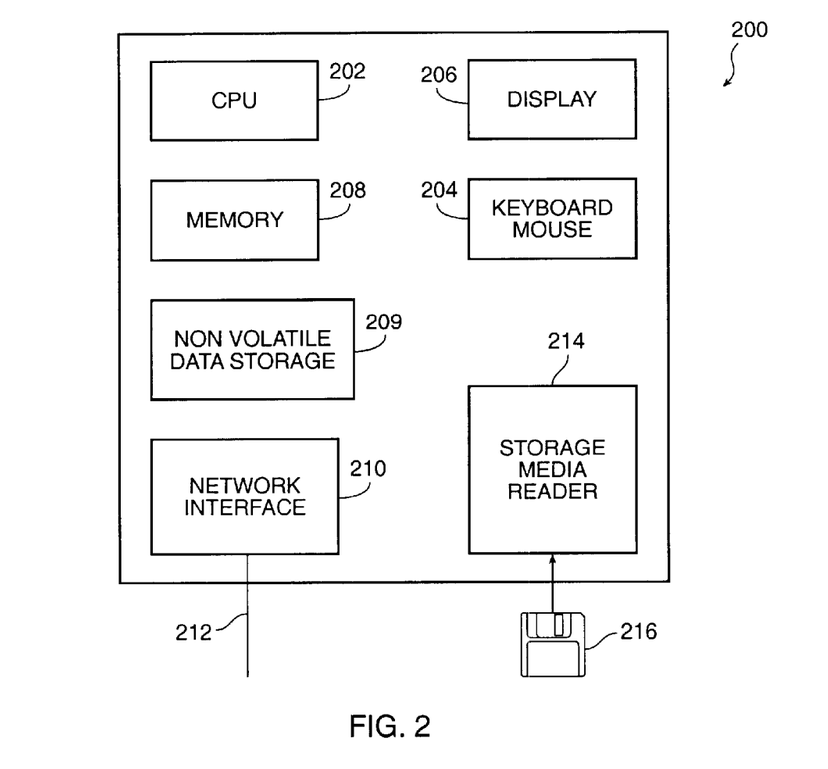
FIG. 2 is a block diagram of the portal server computer illustrated in FIG. 1.

FIG. 2 is a block diagram of an exemplary computer 200 that is used as the portal server 110 (FIG. 1). It should be understood that any of the other computers at the clients 102, 104 or at the information sources 112, 114 can have a similar construction. The information sources 112, 114 for example can comprise network file servers that route web pages along the Internet, or can comprise e-mail servers or file transfer (ftp) servers. Similarly, the client computers 102, 104 can have a variety of computer configurations.

The computer 200 operates under control of a central processor unit (CPU) 202, such as a "Pentium" microprocessor and associated integrated circuit chips, available from Intel Corporation. A user or operator at the portal server computer 200 can input commands and data from a keyboard and display mouse 204, and can view inputs and computer output at a display 206. The display is typically a video monitor or flat panel display. The CPU 202 operates under control of programming steps that are stored, temporarily, in memory 208 to the computer. The computer also contains non-volatile data store 209, such as hard disk storage. Each computer communicates with the Internet and other networks, such as the connecting network, through a network interface 210 that enables communication over a connection 212 between the computer 200 and each network 108, 106 (FIG. 1). The computer also can receive computer instructions, or data, from a storage media reader 214. The storage media reader 214 receives storage media 216, from which it can read stored information. The storage media can comprise floppy diskettes or CD-ROM discs. That is, the storage media can contain program steps that are read into the memory 208 and are then executed by the CPU to perform a method for providing Internet access as described above. The storage media thereby comprises a program product that embodies program steps received by the CPU.

Figure 3:
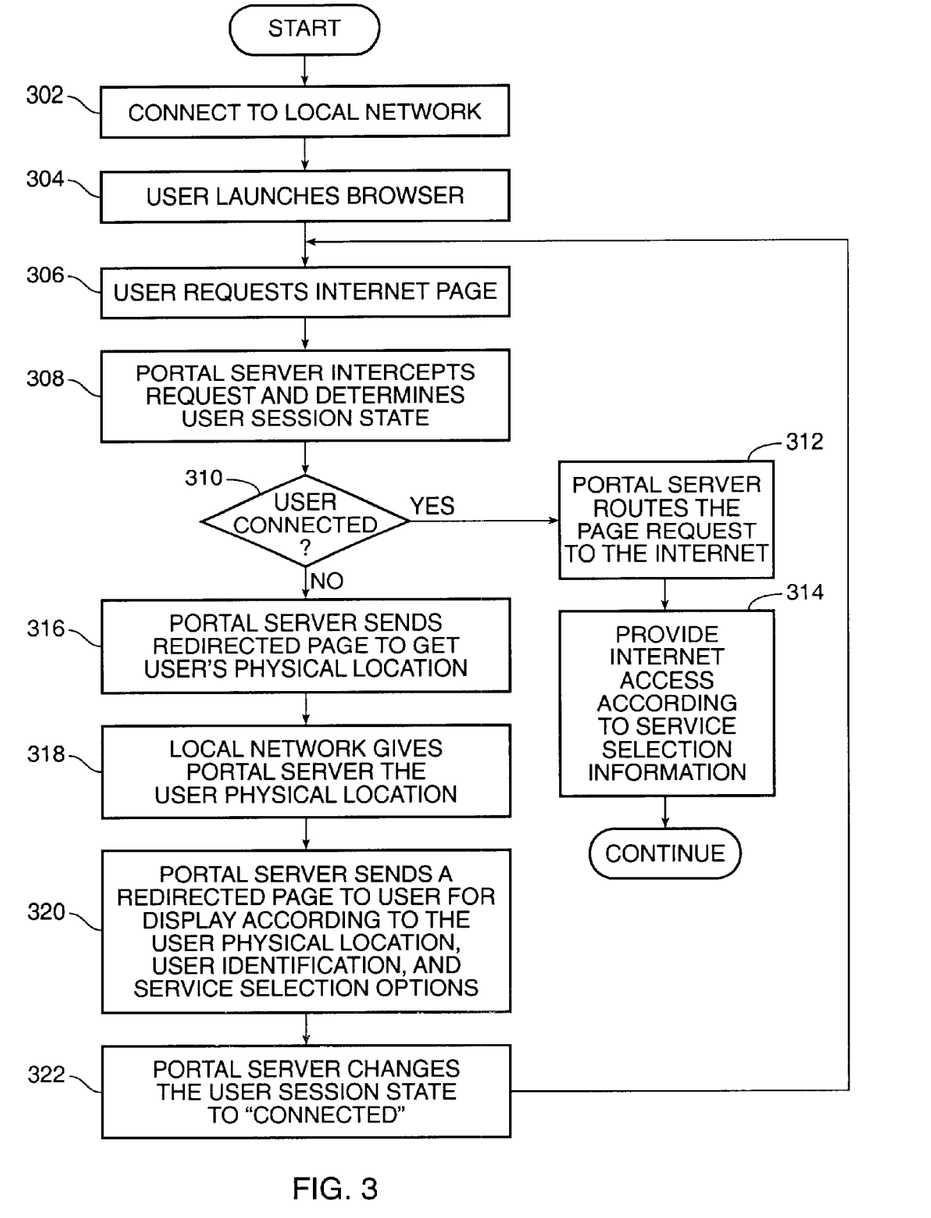
FIG. 3 is a flow diagram that illustrates the processing steps executed by the computer system of FIG. 1 to provide the forced portal in accordance with the invention.

FIG. 3 is a flow diagram that illustrates the processing steps executed by the computer processing system 100 of FIG. 1 to implement the Internet access technique in accordance with the present invention. In the first step, represented by the FIG. 3 flow diagram box numbered 302, the user connects to the local network. This connection may be through a local area network (LAN) that uses the TCP/IP protocol.

After the user is connected to the local network, the user launches a browser program, such as "Navigator" by Netscape Communications, Inc. or "Internet Explorer" by Microsoft Corporation. This step is represented by the flow diagram box numbered 304. Next, the user requests an Internet page, as indicated by the FIG. 3 flow diagram box numbered 306. Thus far, the steps have been entirely conventional techniques for connecting to the Internet and viewing pages at sites on the "World Wide Web". Those skilled in the art will understand that the user request for a web page comprises an Internet protocol "GET" message that is generated by a user's browser and is sent along the Internet to the actual server where the web page resides, where the page is retrieved and returned to the user for viewing. The user request is passed along by each server or router located between the user and the server where the web page resides. In this way, the user request is eventually satisfied so that the web page (or file) is retrieved for the user and the user can view the requested web page. Thus, the processing of box 306 involves a user browser at a client computer generating an Internet "GET" message.

In the next processing step for the access technique in accordance with the invention, the portal server intercepts the user page request and determines the user session state. In particular, the portal server maintains a secure user database that stores user identification (User ID), a port identification (Port ID), a physical location (Physical ID), and a Session State for each user who is on a local network that accesses the Internet through the portal server. When the portal server intercepts the GET message, the portal server checks the user database, finds the user identified as the source of the GET message, and determines the user session state. This processing step is represented by the FIG. 3 flow diagram box numbered 308.

Figure 4:
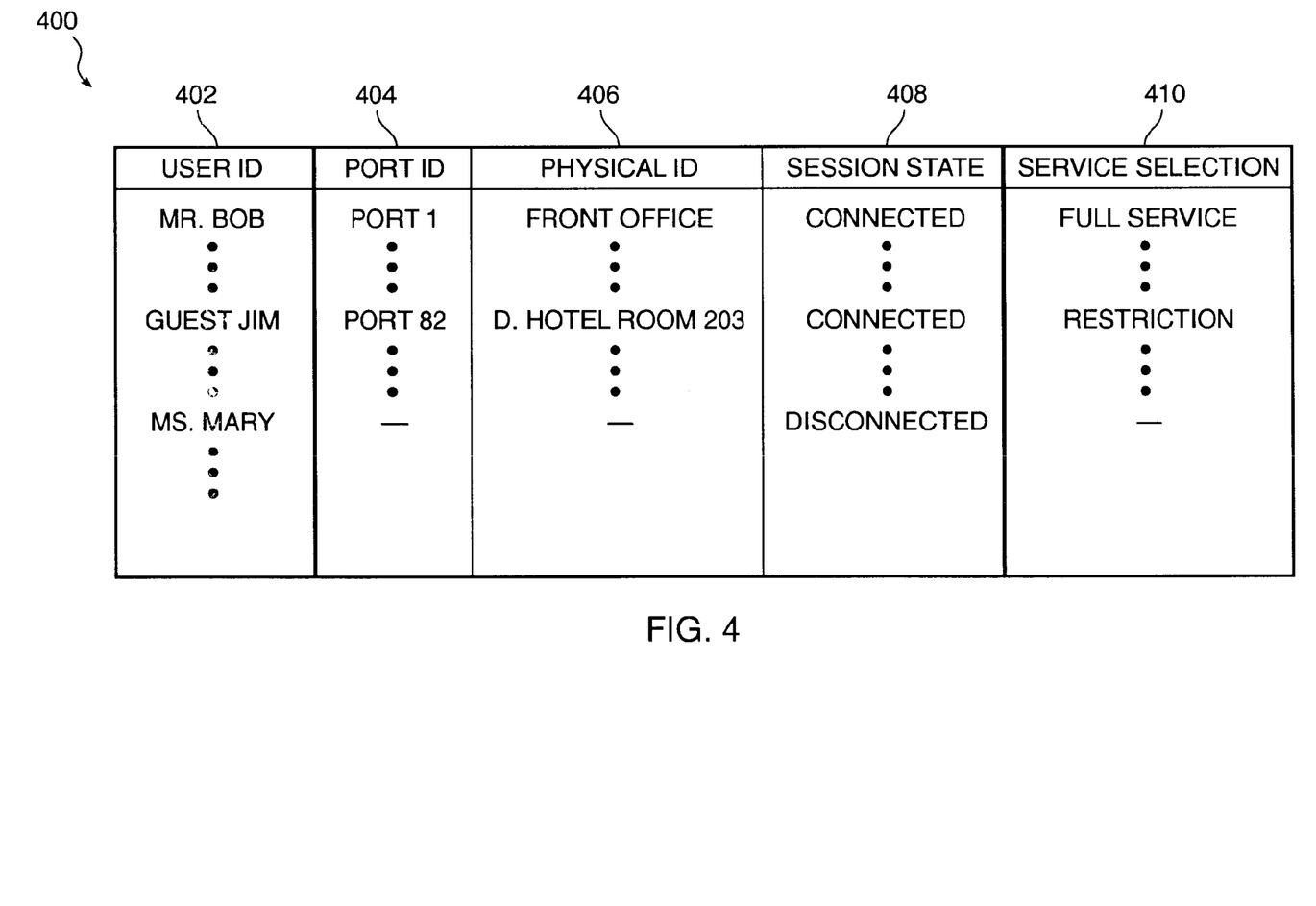
FIG. 4 is a representation of the user table maintained by the portal server illustrated in FIG. 1.

FIG. 4 is a representation of the user table 400 stored in the memory or data store of the portal server. The user table includes columns for User ID 402, Port ID 404, Physical ID 406, and Session State 408. An optional Service Selection column 410 permits some customization of the user's Internet experience, as described further below. Each row of the user table corresponds to a different client computer and user. Data in the FIG. 4 table is for purposes of illustration only. As explained more filly below, the Port ID and Physical ID are known to the portal server only for users who have connected through the portal server. Therefore, the user in FIG. 4 who is not connected has no data in the Port ID and Physical ID columns. Thus, if the portal server intercepts a GET message that identifies the page requester as "Guest Jim", the portal server can easily determine that "Guest Jim" is using the client computer at Port 82, in Room 203 of the Downtown Hotel (D. Hotel), and has already connected through the portal server.

Returning to the flow diagram of FIG. 3, after box 308, the portal server next takes different action depending on whether it found the requesting user to be connected, as indicated by the decision box 310. If the portal server determines that the requesting user has already connected, an affirmative outcome at the decision box, then the portal server routes the user web page request to the Internet and its collection of routers and servers. The page is then returned to the user, following usual Internet protocols and routing. This processing is represented by the flow diagram box numbered 312. Next, as indicated by the flow diagram box numbered 314, the portal server ensures that the user is provided with Internet access according to service selection information. For example, the user may have indicated that certain web sites are not to be available to anyone at that Physical ID. This may be especially valued by parents who want to restrict the sites to which children may visit. In this way, the Service Selection column of the User Table permits the portal server to act as a local network firewall and control the user's Internet experience. After the portal server routes the user requests in accordance with the service selection information, the system continues with normal operation.

Returning to the FIG. 3 decision box 310, if the portal server determines that the web page requesting user is not connected, a negative outcome at the decision box, then the portal server sends a "Redirected page" message to the user, to obtain the user physical location. For the conventional Internet protocols, this may comprise an "SNMP Query" message, which will be familiar to those skilled in the art without further explanation. The "redirected page" processing is represented by the flow diagram box numbered 316. In accordance with IP processing, the redirected page results in the user's local connection network sending the portal server the user physical location information. This processing step is represented by the flow diagram box numbered 318. Next, the portal server sends another redirected page to the user and the local network, as indicated by the flow diagram box numbered 320.

Unlike the earlier Redirected message, however, the second Redirected message, produced at box 320, results in a page being displayed at the user's browser. The page to be displayed is the portal page that is being forced at the user's browser. The portal server sends a portal page that has content that is customized to the user's physical location. Selection of content displayed can also be based on user identification and service selection options. This provides greater flexibility in tailoring the messages, advertising, or other content that will be presented to the user. For example, referring to FIG. 4, all persons who are guests at the "Downtown Hotel" may receive a different forced portal page from the one received by a user at the "Front Office" or received by residential customers. Even within a hotel or office, the system described can be tailored down to the individual physical location, so that people in adjacent offices or rooms could potentially have different forced portal pages.

After the portal server sends the forced portal redirected page for display, the portal server next changes the session state for the user in its table (FIG. 4) from "Disconnected" to "Connected". For every page request thereafter, when the portal server intercepts the request at box 308, the user's request will be routed directly to the Internet after the portal server confirms that the user has already been connected. Thus, every user will be forced to view the forced portal display page once during an Internet session. Normal processing therefore returns to box 306, where the user can continue requesting Internet pages.

Figure 5:
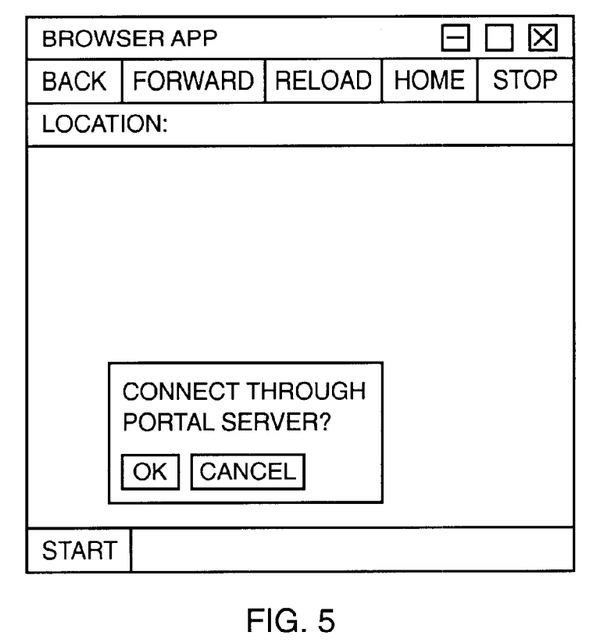
FIG. 5 is a representation of a display on the client computer before the user has established a connection through the portal server of FIG. 1.

As noted above, all users who are connecting through the portal server for the first time in a session will have their session status checked. If a user is not connected, then the server portal processing of box 320 can include displaying a query to the user to determine if the user wants to be connected to the portal server. Such a display is illustrated by the display representation of FIG. 5, which shows a conventional browser window 500 in which a dialogue box 502 is shown, inquiring whether to connect through the portal server. It should be understood, however, that a negative response by the user to the query (do not connect through the portal server) will result in a halt to the Internet connection. As noted, every user will be forced to view the selected portal page once during an Internet session.

Figure 6:
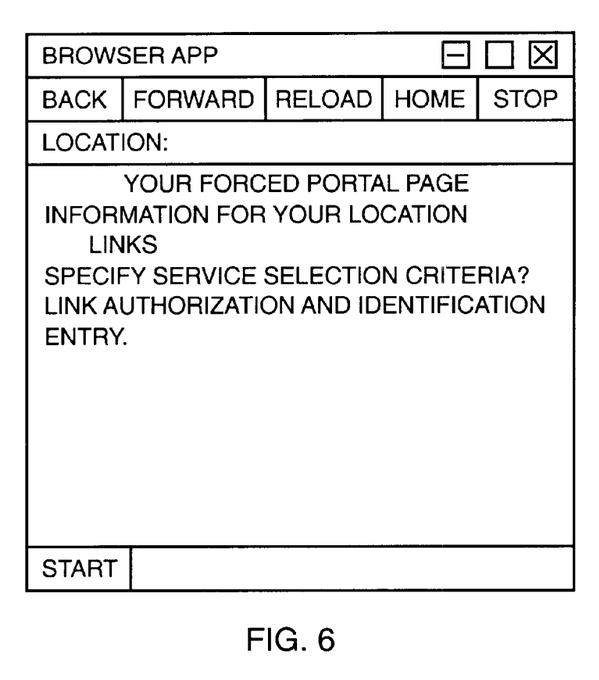
FIG. 6 is a representation of a display on the client computer showing the forced portal page from the portal server of FIG. 1.

If a user connects to the Internet through the portal server, then as noted above, the forced portal page can be selected according to specific and precise user characteristics. An exemplary forced portal page is illustrated in FIG. 6. As illustrated, the forced portal page permits users to link to, for example, local location information. Other features that can be provided on a forced portal page are links to a Service Selection page and to an Authorization and Identification page. These pages provide a form interface that collects the information needed to modify Internet access through the portal server, following authentication of user permission. For example, a user can specify that a particular network access provider can be used. These features permit the Internet service provider, whether providing Internet access for employees in an office or a hotel or an entire city, to highly customize the Internet experience.

The present invention has been described above in terms of a presently preferred embodiment so that an understanding of the present invention can be conveyed. There are, however, many configurations for network communication systems not specifically described herein but with which the present invention is applicable. The present invention should therefore not be seen as limited to the particular embodiments described herein, but rather, it should be understood that the present invention has wide applicability with respect to network communication through portals generally. All modifications, variations, or equivalent arrangements and implementations that are within the scope of the attached claims should therefore be considered within the scope of the invention.

We claim:

1. A method of providing communication between a user and a network, the method comprising:

receiving a user request for access to a network file during a user network connection session with a connecting network;

determining whether the user has a connected user session state or a disconnected user session state with respect to a portal server;

responding to a disconnected user session state by determining a user identity that specifies a physical location for the user and providing the user with a redirected page for display in a user graphical interface program in accordance with the determined user physical location and in accordance with user identification and service selection information, and then changing the user session state to a connected state; and responding to a connected user session state by routing the user request for access to the network file to a network server.

2. A method as defined in claim 1, wherein responding to a disconnected user session state comprises providing the user with a redirected display page having authorization and identification forms that define a service selection.

3. A method as defined in claim 1, wherein responding to a disconnected user session state comprises providing the user with a redirected display page having authorization and identification forms that specify a network access provider.

4. A method as defined in claim 1, wherein the network communications protocol comprises the Internet protocol (IP) and the step of receiving a user request for access to a network file comprises intercepting a user network GET request for a page file from a network server.

5. A method as defined in claim 4, wherein the portal server maintains a user IP address table containing session states for each user and determines the user session state by examining the user's entry in the IP address table.

6. A method as defined in claim 5, wherein the step of determining a user identity that specifies a physical location for a disconnected user state comprises the portal server sending an IP redirect page that is not displayed by the user's browser but contains an SNMP query that obtains from the connecting network the physical location of the user.

7. A method as defined in claim 6, wherein the step of providing the user with a redirected page for display in a user graphical interface program comprises displaying a forced portal page as the redirected page.

8. A method of providing communication between a user and a network, the method comprising:

connecting the user to a local network and generating a network request for a network file from a network server;

intercepting the network request at a portal server and thereby determining the network address of the user to identify the connection state of the user;

responding to a disconnected connection state by sending the user a redirected query page that requests user identification that will identify the physical location of the user, determining a redirected portal page in accordance with the user physical location user identification and user service selection information, sending the user the redirected portal page, and changing the user connection state to connected; and responding to a connected connection state by routing the original network request to a network server and thereby providing the user with access to the requested network file.

9. A method as defined in claim 8, wherein the network communications protocol comprises the Internet protocol (IP) and the step of receiving a user request for access to a network file comprises intercepting a user network GET request for a page file from a network server.

10. A method as defined in claim 9, wherein the portal server maintains a user IP address table containing session states for each user and determines the user session state by examining the user's entry in the IP address table.

11. A method as defined in claim 10, wherein the step of determining a user identity that specifies a physical location for a disconnected user state comprises the portal server sending an IP redirect page that is not displayed by the user's browser but contains an SNMP query that obtains from the connecting network the physical location of the user.

12. A method of providing communication between a user and a network, the method comprising:

connecting the user to a local connecting network;

generating a network request at the user for access to a network file stored at a network server;

intercepting the network request at a portal server and determining the network address of the user and the connection state of the user;

responding to a disconnected user state by sending the user a redirected query page that requests user identification that will identify the physical location of the user;

determining a redirected portal page in accordance with the user physical location user identification and user service selection information;

sending the user the redirected portal page, and changing the user connection state to connected; and responding to a connected user state by routing the original network request to a network server and thereby providing the user with access to the requested network file.

13. A server that manages access by a user to a network, the server comprising a computer with:

a central processing unit that communicates with network information sources; and memory that contains programming instructions executed by the central processing unit to cause the computer to perform steps such that it receives a user request for access to a network file during a user network connection session with a connecting network, determines whether the user has a connected user session state or a disconnected user session state with respect to a portal server, responds to a disconnected user session state by determining a user identity that specifies a physical location for the user and providing the user with a redirected page for display in a user graphical interface program in accordance with the determined user physical location user identification and in accordance with service selection information, and then changing the user session state to a connected state, and responds to a connected user session state by routing the user request for access to the network file to a network server.

14. A server as defined in claim 13, wherein the server responds to a disconnected user session state by providing the user with a redirected display page having authorization and identification forms that define a service selection.

15. A server as defined in claim 13, wherein the server responds to a disconnected user session state by providing the user with a redirected display page having authorization and identification forms that specify a network access provider.

16. A server as defined in claim 13, wherein the network communications protocol comprises the Internet protocol (IP) and the server receives a user request for access to a network file by intercepting a user network GET request for a page file from a network server.

17. A server as defined in claim 16, wherein the server maintains a user IP address table containing session states for each user and determines the user session state by examining the user's entry in the IP address table.

18. A server as defined in claim 17, wherein the server determines a user identity that specifies a physical location for a disconnected user state by sending an IP redirect page that is not displayed by the user's browser but contains an SNMP query that obtains from the connecting network the physical location of the user.

19. A server as defined in claim 18, wherein the server provides the user with a redirected page for display in a user graphical interface program by displaying a forced portal page as the redirected page.

20. A program product for use in a computer system that executes program steps recorded in a computer-readable media to perform a method for providing communication between a user and a network, the program product comprising:

a recordable media; and a program of computer-readable instructions executable by the computer system to perform method steps comprising receiving a user request for access to a network file during a user network connection session with a connecting network;

determining whether the user has a connected user session state or a disconnected user session state with respect to a portal server;

responding to a disconnected user session state by determining a user identity that specifies a physical location for the user and providing the user with a redirected page for display in a user graphical interface program in accordance with the determined user physical location and in accordance with user identification and service selection information, and then changing the user session state to a connected state; and responding to a connected user session state by routing the user request for access to the network file to a network server.

21. A program product as defined in claim 20, wherein responding to a disconnected user session state comprises providing the user with a redirected display page having authorization and identification forms that define a service selection.

22. A program product as defined in claim 20, wherein responding to a disconnected user session state comprises providing the user with a redirected display page having authorization and identification forms that specify a network access provider.

23. A program product as defined in claim 20, wherein the network communications protocol comprises the Internet protocol (IP) and the step of receiving a user request for access to a network file comprises intercepting a user network GET request for a page file from a network server.

24. A program product as defined in claim 23, wherein the portal server maintains a user IP address table containing session states for each user and determines the user session state by examining the user's entry in the IP address table.

25. A program product as defined in claim 24, wherein the method step of determining a user identity that specifies a physical location for a disconnected user state comprises the portal server sending an IP redirect page that is not displayed by the user's browser but contains an SNMP query that obtains from the connecting network the physical location of the user.

26. A program product as defined in claim 25, wherein the method step of providing the user with a redirected page for display in a user graphical interface program comprises displaying a forced portal page as the redirected page.

* * * * *

UNITED STATES PATENT AND TRADEMARK OFFICE
CERTIFICATE OF CORRECTION

PATENT NO.    : 6,460,084 B1
DATED         : October 1, 2002
INVENTOR(S)   : Peter Van Horne et al.

It is certified that error appears in the above-identified patent and that said Letters Patent is hereby corrected as shown below:

Column 5,
Line 12, replace "filly" with -- fully --.

Column 6,
After line 51 and before line 52 insert the following paragraph
-- The present invention provides a customized portal site to regulate Internet access and ensure that users must all go through a forced portal display page. Because all users who gain access to the Internet must go through the portal server, the forced portal page can be used for ad placement and the like, to ensure exposure. In this way, the network communication scheme permits a greater customization for a user's Internet experience. --

Signed and Sealed this

Eleventh Day of March, 2003

JAMES E. ROGAN
*Director of the United States Patent and Trademark Office*